I. O. MARKELL.
INNER TUBE FOR PNEUMATIC TIRES.
APPLICATION FILED AUG. 21, 1919.
1,369,257.
Patented Feb. 22, 1921.
2 SHEETS—SHEET 1.
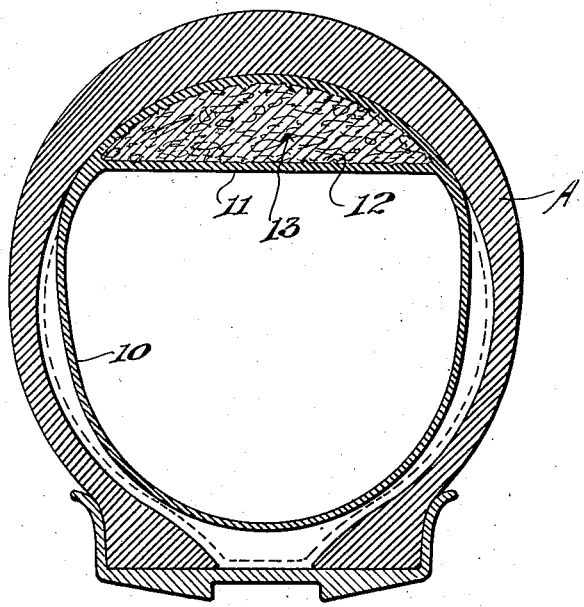
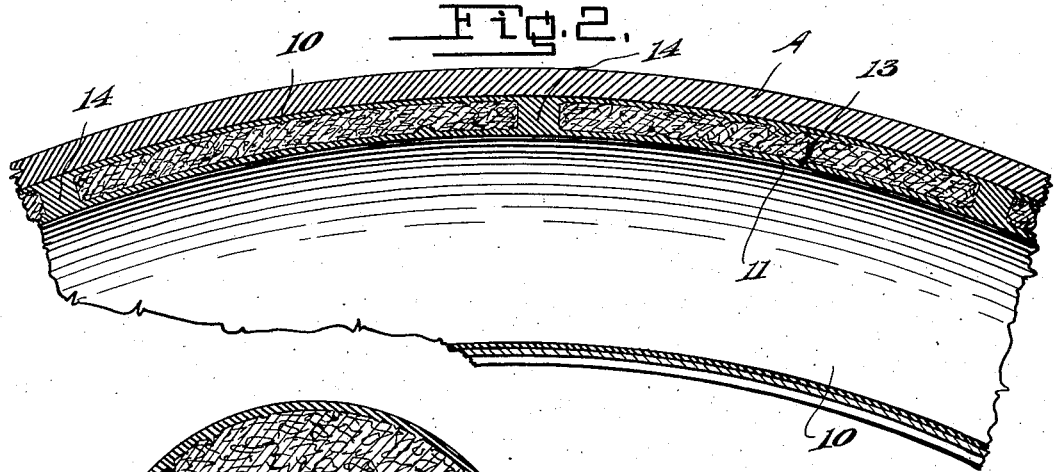
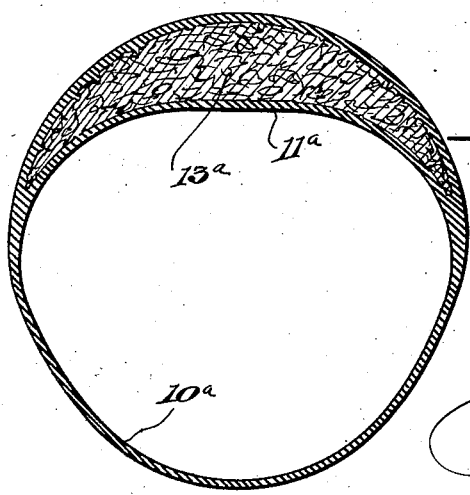
Theodore O. Markell
Inventor
By *Lancaster & Allwine*
Attorneys

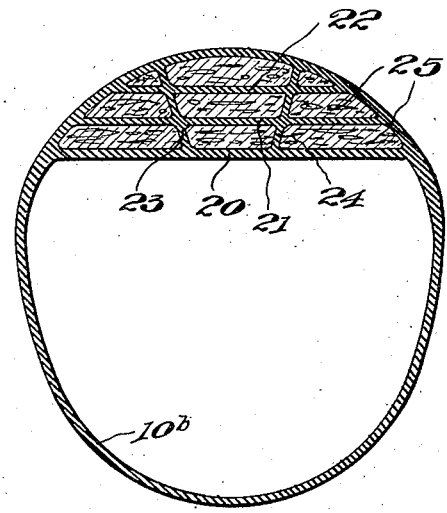
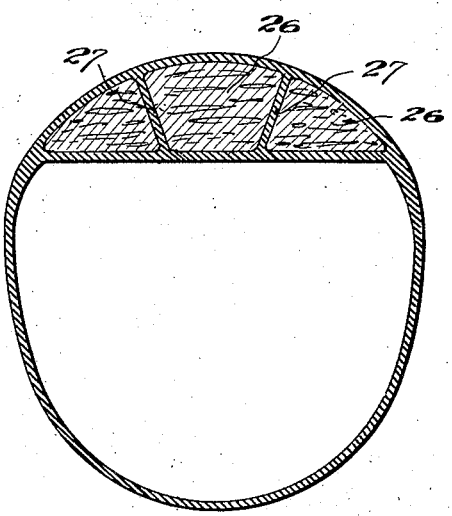
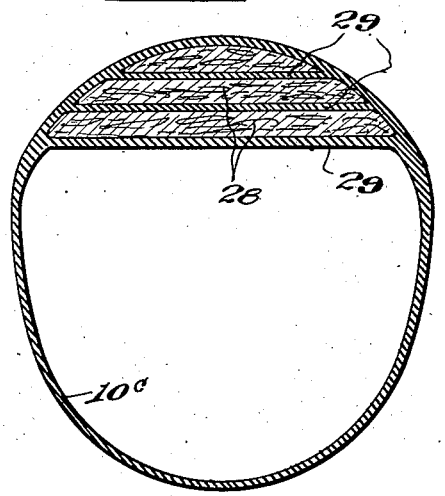
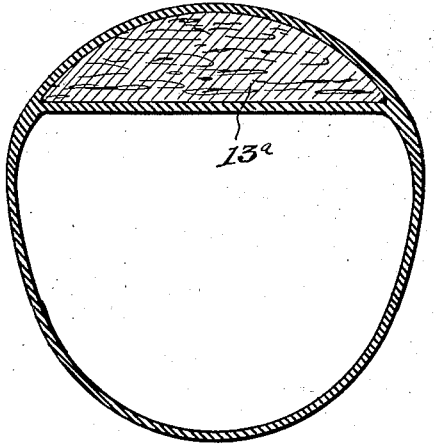

UNITED STATES PATENT OFFICE.

THEODORE O. MARKELL, OF CLEVELAND, OHIO.

INNER TUBE FOR PNEUMATIC TIRES.

1,369,257.

Specification of Letters Patent.

Patented Feb. 22, 1921.

Application filed August 21, 1919. Serial No. 319,000.

*To all whom it may concern:*

Be it known that I, THEODORE O. MARKELL, a citizen of the United States, residing at Cleveland, in the county of Cuyahoga and State of Ohio, have invented certain new and useful Improvements in Inner Tubes for Pneumatic Tires, of which the following is a specification.

This invention relates to pneumatic tires such as used upon motor vehicles, and an object of the invention is to provide an inner inflatable tube for pneumatic tires, which has the portion thereof that lies next to the inner surface of the tread portion of the casing of the tire reinforced, or thickened, to prevent puncturing of this portion of the tire, and since the majority of punctures of a tire are at or through the tread portion thereof, such an inner tube will materially decrease the liability of puncturing of the inner inflatable tube of the pneumatic tire.

A further object of this invention is to provide, in an inner tube as specified, a circumferentially extending filler formed of cork, either in granular form impregnated with rubber, in layer form, or any analogous material of less elasticity than the body of the inner tube, and which filler material also has a tendency to decrease liability of puncturing of the tire, by increasing the thickness thereof at the tread portion of the tube, without materially increasing the weight of the tire.

In the manufacture of tire shoes or casings, there are differences in the inner circumference of tires of the same outer circumference and transverse diameters, and to provide for these differences, the filler embedded in the inner tube is made in circumferentially extending sections, having their meeting ends spaced, between which meeting ends are positioned a plurality of webs or sections of elastic rubber vulcanized to or formed or molded integrally with the inner tube, so as to permit a limited circumferential expansion of the inner tube.

A still further object of the invention is to mold or shape the thickened portion of the tube, which carries the filler, to snugly fit the inner surface of a tire shoe or casing, inwardly of the tread portion thereof, which thickened portion has very little if any expansion upon the inflating of the inner tube, thereby eliminating liability of rupturing or distorting the filler.

Other objects of the invention will appear in the following detailed description taken in connection with the accompanying drawings, forming a part of this specification, and in which drawings:

Figure 1 is a cross section through a pneumatic tire showing the improved inner tube mounted therein.

Fig. 2 is a fragmentary circumferential section through the tire illustrating the manner of spacing the sections of the filler.

Fig. 3 is a cross section through a modified form of the inner tube.

Fig. 4 is a cross section through a second modified form of the inner tube.

Fig. 5 is a cross section through another modified form of the tube illustrating a plurality of circumferentially extending filler sections, which are spaced by radially extending webs or ribs.

Fig. 6 is a section through still another modified form of the inner tube structure, illustrating the layers of the filler extending circumferentially of the tube and spaced from each other by circumferential webs or ribs of elastic rubber, and Fig. 7 is a modified form of the tube showing a filler in which the circumferential sections thereof are formed of a single layer of cork or analogous material embodying slight elasticity and being of less specific gravity than the rubber of which the inner tube is made.

Referring more particularly to the drawings, the casing A of an ordinary pneumatic tire such as used upon motor vehicles, has positioned therein the inner tube 10, which is formed of elastic rubber, as is ordinary in the construction of inner tubes, which are inflated within the casing or tube A of a pneumatic tire. The tube 10 is provided with a circumferentially extending web 11, extending across the case, near the portion of the tube 10 which engages the inner surface of the casing A, inwardly of the tread thereof, which web being vulcanized or molded with the tube body 10 forms a pocket 12 extending circumferentially of the inner tube, which pocket has a filler 13, positioned therein. The filler 13 is preferably formed of granular cork impregnated with rubber or analogous material, having slight elasticity and being of less specific gravity than the rubber of which the tube 10 is made, so as to thicken the portion of the inner tube inwardly of the tread of the casing A of the tire, without materially increasing the weight of the tire. The filler 13 is formed in a plurality of circumferentially spaced sections as clearly shown in Fig. 2 of the drawings, and these sections have webs or partitions 14 of elastic rubber between their facing ends, which webs are vulcanized to or molded with the webs 11 at the body of the tube 10. The elastic ribs or sections 14 are provided to permit limited circumferential expansion of the thickened portion of the tube 10, to allow the tube to properly fit within the casing A. The thickened portion of the inner tube 10, which includes the filler 13, is molded to snugly fit or conform to the inner portion of the tube or casing A inwardly of the tread thereof, as clearly shown in Fig. 1 of the drawings, so as to prevent distortion of the filler 13, when the tube 10 is inflated, which distortion would, by rupturing or separating parts of the filler, tend to decrease the efficiency of the improved inner tube.

The web or partition 11 extends straight, transversely of the inner tube 10, as shown in Fig. 1 of the drawings, while in the modified form illustrated in Fig. 3 of the drawings, this web 11$^a$ curves inwardly adjacent its merging with the body A forming a substantially crescent shaped pocket 13$^a$.

In the modified form illustrated in Figs. 4, 5 and 6, a plurality of adjacent circumferentially extending filler sections are provided, which are embedded in the inner tube at the tread or thickened portion thereof and separated one from another by walls of elastic rubber. These forms differ, in the construction of the circumferentially extending filler sections. In Fig. 4 of the drawings, the filler sections are separated by circumferentially extending transverse webs 20, 21 and 22, of elastic rubber and radially extending webs 23 and 24, providing a plurality of circumferentially extending filler sections 25, arranged in concentric circles circumferentially of the tube 10$^b$ and radially of the axis of circumferential centers of the tube, while in Fig. 5 the filler sections 26, are spaced by circumferentially extending radial ribs or webs 27, the transverse webs 20, 21 and 22 being eliminated. The modified form illustrated in Fig. 6 of the drawings, shows a plurality of circumferentially extending filler sections 28, which are embedded in the inner tube 10$^b$ at the tread portion thereof and adjacent to each other, being separated by the circumferentially extending transverse webs or ribs 25, which are formed integrally with the tube 10$^c$.

The modified form illustrated in Fig. 7 of the drawings, is similar to the form illustrated in Fig. 1 of the drawings, differing therefrom only in that the filler sections 13$^a$ are formed of a single piece of cork, instead of granular cork impregnated with rubber or analogous adhesive. It is to be understood that in all of the forms illustrated, the various filler sections are spaced circumferentially, as shown in Fig. 2 of the drawings, between the facing ends of which sections are positioned the elastic sections or ribs 14, for permitting of the limited circumferential expansion of the tube.

From the foregoing description taken in connection with the drawings, it will be seen that while offering the necessary protection against punctures in a place where they are most likely to occur, the inner tube is nevertheless as pliable and as capable of expansion as any tube of approved type in general use, and because of the low specific gravity of the materials used for reinforcement or in forming the filler sections, no undue pressure or weight is placed upon the portion of the inner tube which is expanded by inflation of the tube.

Changes in details may be made without departing from the spirit of this invention, but;

I claim:

In combination with a casing or shoe of a vehicle tire, of an improved inner tube therefor comprising a body of resilient inflatable material hollow within and having a generally circular cross section when inflated within the casing or shoe, a partition integral with the material of the inner tube extending transversely across the inner tube at a relatively great distance inwardly from the tread portion, said partition extending at right angles to the vertical plane of the tire and forming a chord of the circular wall of the inner tube, the partition subtending an arc of the inner tube extending about the tread portion, said partition dividing the hollow interior of the inner tube into a relatively great inner air receiving compartment and a relatively small sector-shaped outer compartment, sector-shaped webs connecting the arc-shaped tread portion with the partition and dividing the outer compartment into a plurality of elongated separated spaces, said webs being comparatively thick in a circumferential direction, and light compressible material placed compactly in the spaces between said webs and forming sector-shaped cushions.

THEODORE O. MARKELL.